United States Patent
Horishita

(10) Patent No.: US 10,152,109 B2
(45) Date of Patent: Dec. 11, 2018

(54) INFORMATION PROCESSING APPARATUS, CONTROL METHOD FOR THE SAME, AND STORAGE MEDIUM

(71) Applicant: CANON KABUSHIKI KAISHA, Tokyo (JP)

(72) Inventor: Yusuke Horishita, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/921,152

(22) Filed: Oct. 23, 2015

(65) Prior Publication Data
US 2016/0124496 A1 May 5, 2016

(30) Foreign Application Priority Data
Nov. 4, 2014 (JP) .................. 2014-224616

(51) Int. Cl.
*G06F 1/26* (2006.01)
*G06F 1/32* (2006.01)
*G06F 3/12* (2006.01)

(52) U.S. Cl.
CPC .......... *G06F 1/3231* (2013.01); *G06F 1/3284* (2013.01); *G06F 1/26* (2013.01); *G06F 3/1221* (2013.01); *G06F 3/1229* (2013.01); *Y02D 10/159* (2018.01); *Y02D 10/1592* (2018.01); *Y02D 10/173* (2018.01)

(58) Field of Classification Search
CPC .................................... G06F 1/32; G06F 1/26
See application file for complete search history.

(56) References Cited

U.S. PATENT DOCUMENTS 9,078,208 B1 * 7/2015 Dutta .................... H04W 52/02
9,374,655 B1 * 6/2016 Lee ....................... H04W 4/008
(Continued)

FOREIGN PATENT DOCUMENTS

CN        102478770 A     5/2012
JP      2008017381 A     1/2008
(Continued)

OTHER PUBLICATIONS

Office Action issued in Chinese Appln. No. 201510725323.1 dated Dec. 5, 2017. English Translation provided.
(Continued)

*Primary Examiner* — Phil Nguyen
(74) *Attorney, Agent, or Firm* — Rossi, Kimms & McDowell LLP

(57) ABSTRACT

An information processing apparatus obtains a measurement value D of the distance between the object and information processing apparatus using a human detection sensor, and detects the object as a user (user detection state ST3) by comparing the measurement value D and a predetermined threshold value. The power mode of the information processing apparatus is set to a standby mode if a user has been detected, and is set to a sleep mode if a user has not been detected. If a state in which a user has been detected continues for a predetermined time, the information processing apparatus changes the sensitivity of the human detection sensor by changing the threshold value for the detection state determination such that the object detected by the human detection sensor is no longer detected as a user.

11 Claims, 11 Drawing Sheets

(56) References Cited

U.S. PATENT DOCUMENTS

| | | | |
|---|---|---|---|
| 2010/0150600 A1* | 6/2010 | Oyoshi | G03G 15/5004 399/88 |
| 2011/0066366 A1* | 3/2011 | Ellanti | G01C 21/3438 701/533 |
| 2012/0137154 A1* | 5/2012 | Azuma | G03G 15/5004 713/323 |
| 2013/0265248 A1* | 10/2013 | Nagahara | G06F 3/041 345/173 |
| 2015/0061701 A1* | 3/2015 | Fujii | G06F 3/044 324/679 |
| 2016/0179265 A1* | 6/2016 | Zeng | G06F 1/3231 345/173 |

FOREIGN PATENT DOCUMENTS

| | | | |
|---|---|---|---|
| JP | 2010147725 A | 7/2010 |
| JP | 2012058645 A | 3/2012 |
| JP | 2012203132 A | 10/2012 |
| JP | 5598628 B1 | 10/2014 |

OTHER PUBLICATIONS

Office Action issued in Japanese Appln. No. 2014-224616 dated Aug. 17, 2018.
Office Action issued in Japanese Application No. 2014-224616 dated Oct. 26, 2018.

* cited by examiner

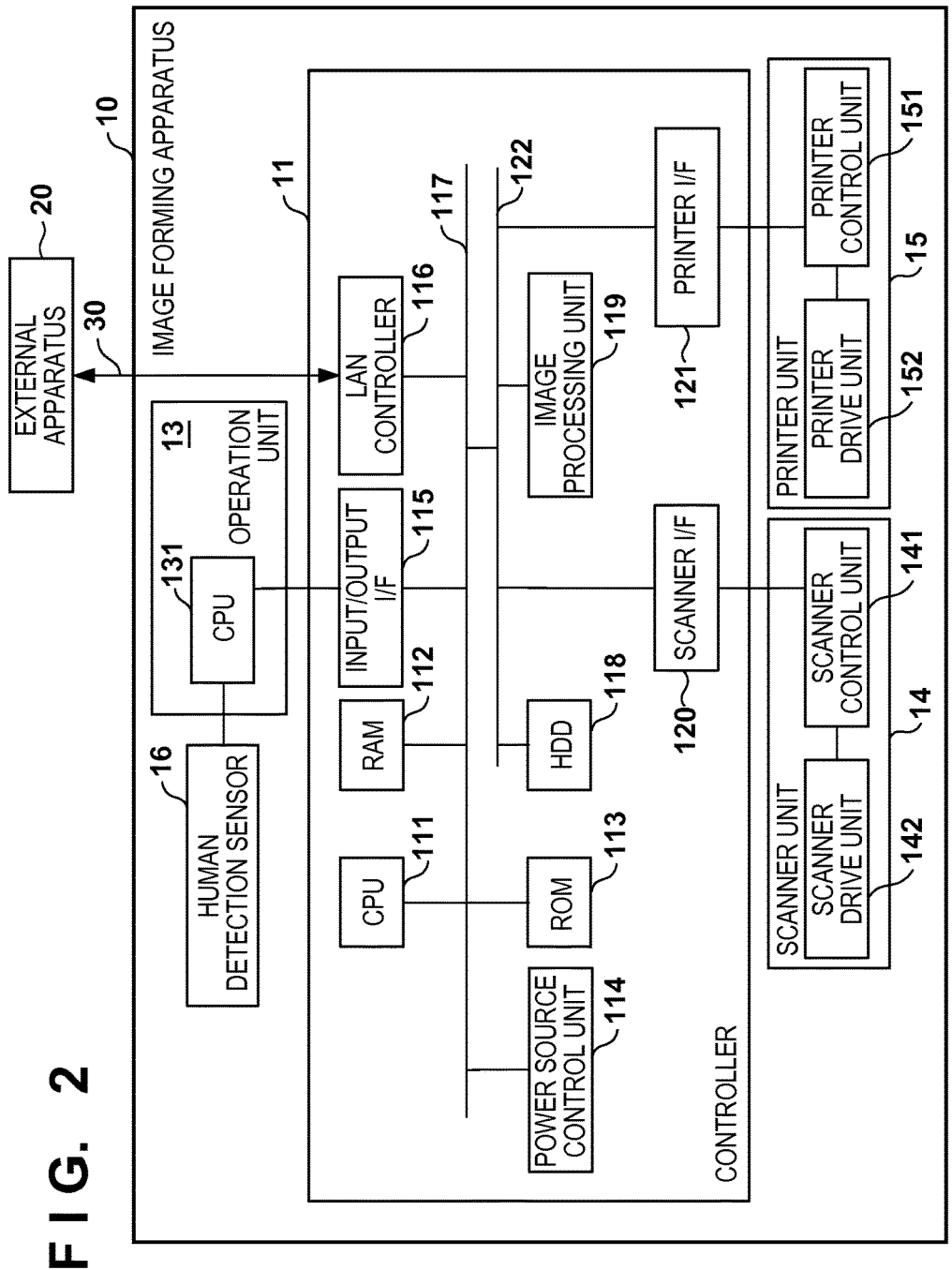

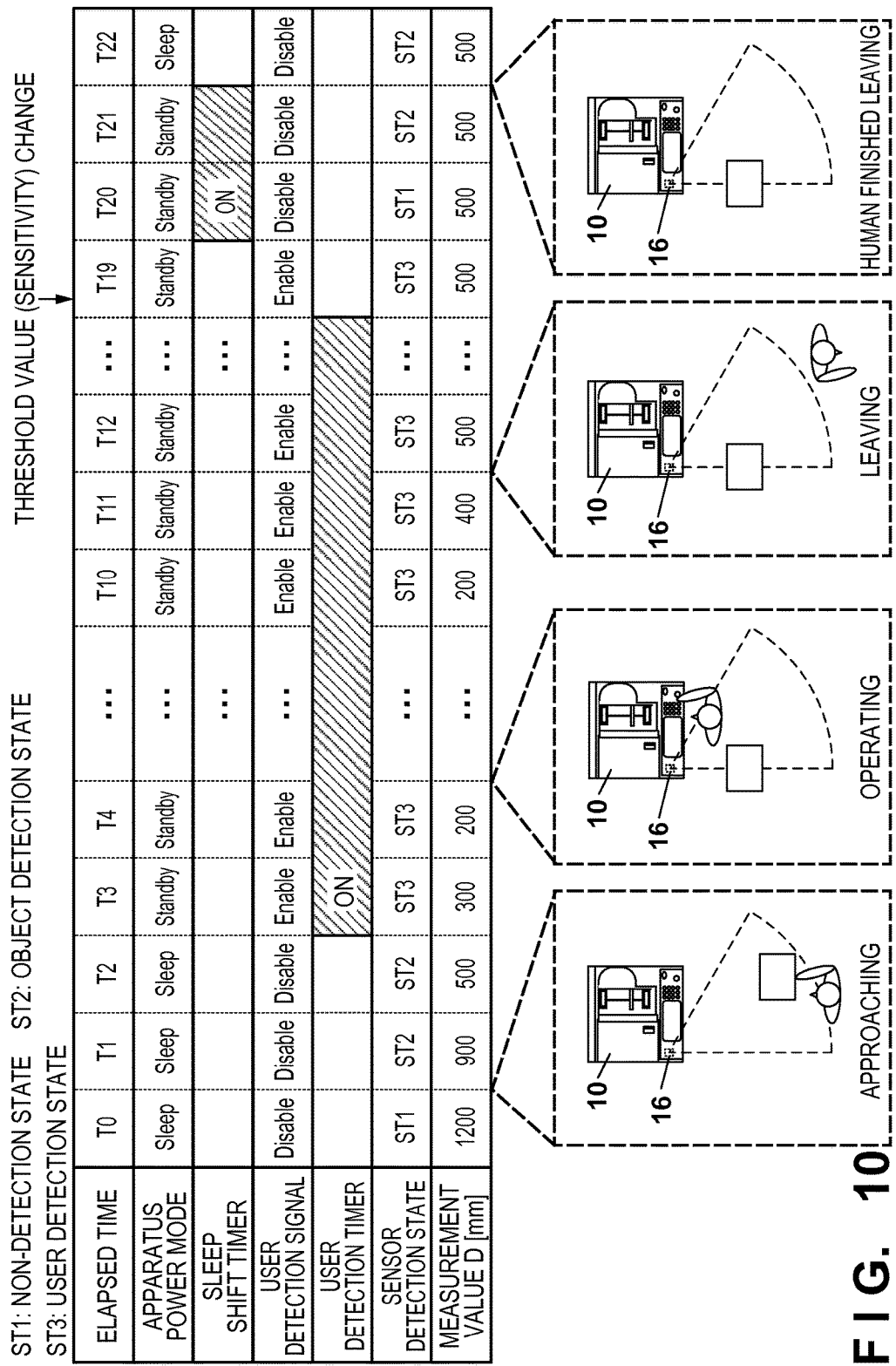
F I G. 10

INFORMATION PROCESSING APPARATUS, CONTROL METHOD FOR THE SAME, AND STORAGE MEDIUM

BACKGROUND OF THE INVENTION

Field of the Invention

The present invention relates to an information processing apparatus, a control method for the same and a storage medium.

Description of the Related Art

There are known to be image forming apparatuses that include a human detection sensor for detecting a human (user) approaching the image forming apparatus. Japanese Patent Laid-Open No. 2012-203132 discloses a technique in which an image forming apparatus that includes such a human detection sensor returns from a power saving state when a human approaching the image forming apparatus is detected by the human detection sensor.

The image forming apparatus disclosed in Japanese Patent Laid-Open No. 2012-203132 changes the power state of the image forming apparatus from the power saving state to a standby state if a human is detected by the human detection sensor. For this reason, if some sort of object continues to exist in front of the image forming apparatus, such as the case where a human is standing in front of the image forming apparatus or an object is placed there, the image forming apparatus determines that a human exists in front of the apparatus, and sets the image forming apparatus to the standby state. As a result, the image forming apparatus is maintained in the standby state even if a human (user) with an intention of using the image forming apparatus does not actually exist in front of the image forming apparatus.

Also, when the user shifts the image forming apparatus to the power saving state by pressing a power save button for shifting the image forming apparatus to the power saving state, there is a possibility that the user remains in front of the image forming apparatus instead of moving away. In this case, the image forming apparatus again returns from the power saving state to the standby state due to the user being detected by the human detection sensor.

SUMMARY OF THE INVENTION

The present invention has been achieved in light of the above-described problems. The present invention provides a technique for, in an information processing apparatus that includes a sensor for detecting an object in the periphery, more appropriately executing power mode control that is based on a human (user) detection result from a sensor.

According to one aspect of the present invention, there is provided an information processing apparatus that has a first power state and a second power state having lower power consumption than the first power state, the information processing apparatus comprising: a sensor configured to measure a distance to an object; a power control unit configured to shift the information processing apparatus to the first power state from the second power state in a case where the distance to the object measured by the sensor is less than a threshold value; and a change unit configured to change the threshold value in a case where a state in which the distance to the object measured by the sensor is less than the threshold value continues for a predetermined time.

According to another aspect of the present invention, there is provided a control method for controlling an information processing apparatus that has a first power state and a second power state having lower power consumption than the first power state, the information processing apparatus comprising a sensor configured to measure a distance to an object, and the method comprising: shifting the information processing apparatus to the first power state from the second power state in a case where the distance to the object measured by the sensor is less than a threshold value; and changing the threshold value in a case where a state in which the distance to the object measured by the sensor is less than the threshold value continues for a predetermined time.

According to still another aspect of the present invention, there is provided a non-transitory computer-readable storage medium storing a computer program for causing a computer to execute steps of a control method for controlling an information processing apparatus that has a first power state and a second power state having lower power consumption than the first power state, the information processing apparatus comprising a sensor configured to measure a distance to an object, and the method comprising: shifting the information processing apparatus to the first power state from the second power state in a case where the distance to the object measured by the sensor is less than a threshold value; and changing the threshold value in a case where a state in which the distance to the object measured by the sensor is less than the threshold value continues for a predetermined time.

According to the present invention, in an information processing apparatus that includes a sensor for detecting an object in the periphery, it is possible to more appropriately execute power mode control that is based on a human (user) detection result from a sensor. For example, even if an object or a human with no intention of using the information processing apparatus continues to exist in the periphery of the information processing apparatus, it is possible to automatically shift the information processing apparatus to a sleep mode (power saving state). Also, even if a user who pressed a button for instructing a shift to the sleep mode remains in the periphery of the information processing apparatus, the information processing apparatus that has shifted to the sleep mode can be prevented from returning from the sleep mode.

Further features of the present invention will become apparent from the following description of exemplary embodiments (with reference to the attached drawings).

BRIEF DESCRIPTION OF THE DRAWINGS

FIG. 2 is a block diagram showing an example of a hardware configuration of the image forming apparatus 10.

FIG. 10 is a diagram showing a second example of a relationship between detection states of the human detection sensor 16 and power modes of the image forming apparatus.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

Image Forming Apparatus Configuration

Figure 1A:
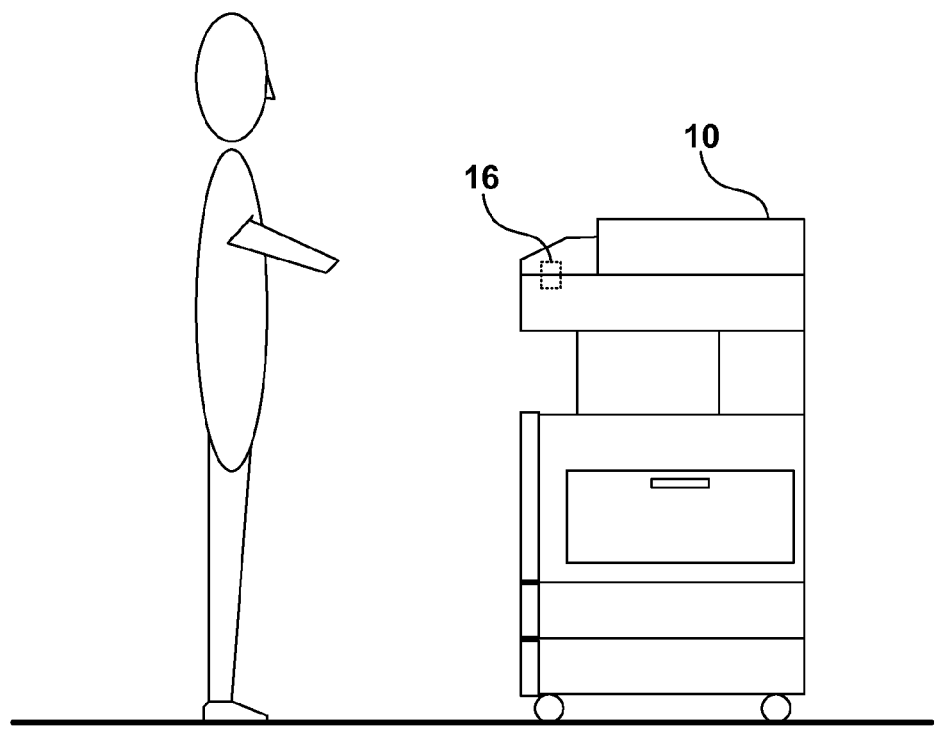
FIG. 1A is a side view of an external appearance of an image forming apparatus 10.
Figure 1B:
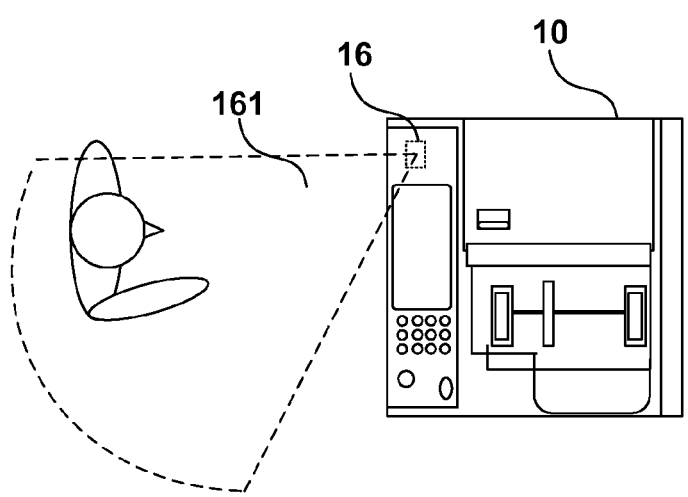
FIG. 1B is a top view of the external appearance of the image forming apparatus 10.

FIGS. 1A and 1B are respectively a side view and a top view of the external appearance of an image forming apparatus 10 according to an embodiment. The image forming apparatus 10 has multiple functions, such as a print function, a scan function, a copy function, and a FAX function. The image forming apparatus 10 includes a human detection sensor 16 as a sensor for detecting an object that exists in the periphery of the image forming apparatus. The human detection sensor 16 is used to detect a human (user) approaching the image forming apparatus 10. A signal output from the human detection sensor 16 is input to and processed by a CPU 131 of an operation unit 13 (FIG. 2). As shown by the dashed lines in FIG. 1B, the human detection sensor 16 has a fan-shaped detection area 161 in front of the image forming apparatus 10.

The human detection sensor 16 of the present embodiment is an ultrasonic sensor that outputs a 40 KHz pulse wave, which is in a non-audible frequency range, and receives a reflected wave of the pulse wave that has been reflected by an object. Note that the human detection sensor 16 may be a sensor other than an ultrasonic sensor, as long as it is a sensor that can detect an object (including a human). For example, it is possible to use an infrared transmitting/receiving module that can check for change in the distance between the apparatus and an object at a constant time interval similarly to the ultrasonic sensor, or an infrared receiving sensor that receives infrared light emitted by a human. Alternatively, it is possible to use a capacitance sensor that measures the distance between the sensor and an object based on the capacitance between the sensor and the object. Furthermore, it is possible to use a camera or an infrared array sensor in which infrared receiving units are arranged in a line or in a matrix. Note that these sensors may be arranged to be directed upward in order to detect humans without being influenced by impedances such as a computer placed on a desk.

FIG. 2 is a block diagram showing an example of the hardware configuration of the image forming apparatus 10. The image forming apparatus 10 includes a controller 11 that controls operation of the image forming apparatus 10, an operation unit 13, a scanner unit 14, a printer unit 15, and the human detection sensor 16.

The controller 11 can communicate with the operation unit 13, the scanner unit 14, and the printer unit 15. The controller 11 includes a CPU 111, a RAM 112, a ROM 113, a power source control unit 114, an input/output interface (I/F) 115, and a LAN controller 116, which are connected to a system bus 117. The controller 11 also includes an HDD (hard disk drive) 118, an image processing unit 119, a scanner I/F 120, and a printer I/F 121, which are connected to an image bus 122.

By reading out programs such as a control program stored in the ROM 113 and executing them, the CPU 111 controls the operation of devices in the image forming apparatus 10, and controls processing executed in the controller 11. The RAM 112 is a system work memory for the operation of the CPU 111, and is also used for temporarily saving image data. Data such as a boot program for the image forming apparatus 10 is stored in the ROM 113.

The power source control unit 114 controls the power source of the image forming apparatus 10 in accordance with an instruction from the CPU 111 and user operations (e.g., an operation on a power save button) performed by the user on the operation unit 13. The power source control unit 114 can detect a power source off operation performed on the power source switch, and notifies the detection result to the CPU 111 as a power-off request. Upon receiving a power-off request from the power source control unit 114, the CPU 111 causes the image forming apparatus 10 to shift to a state in which the power source can be stopped, and issues a power source stop instruction to the power source control unit 114.

The LAN controller 116 communicates with an external apparatus 20 connected thereto via a network 30. The HDD 118 stores system software and various types of data such as image data. The image processing unit 119 reads out image data stored in the RAM 112, and performs image processing such as enlargement, reduction, and color adjustment with respect to the JPEG or JBIG format or the like. The scanner I/F 120 is an interface for connecting the image bus 122 to a scanner control unit 141 of the scanner unit 14. The printer I/F 121 is an interface for connecting the image bus 122 to a printer control unit 151 of the printer unit 15. The image bus 122 is a transmission line for transmitting image data, and is configured by a PCI bus, an IEEE 1394 bus, or the like.

The operation unit 13 includes a CPU 131 that is connected to the system bus 117 via the input/output I/F 115, as well as an input I/F and an output (display) I/F (not shown) for the user, such as an LCD, a touch panel, hardware keys, or an LED. The CPU 131 is connected to the human detection sensor 16 as well. The operation unit 13 may include a communication I/F for communication with a mobile terminal held by the user, such as an NFC reader/writer or a Bluetooth (registered trademark) module.

The scanner unit 14 has the scanner control unit 141 and a scanner drive unit 142, and generates image data by optically reading an image from an original. The scanner drive unit 142 includes a drive unit for moving a reading head that reads an image from an original, a drive unit for conveying an original to a reading position, and the like. The scanner control unit 141 performs communication with the CPU 111 via the scanner I/F 120, and controls operation of the scanner drive unit 142. In the case of reading (scanning) an original, the scanner drive unit 142 receives setting information set by the user from the CPU 111, and controls operation of the scanner drive unit 142 based on the setting information.

The printer unit 15 has the printer control unit 151 and a printer drive unit 152, and forms an image on a recording medium (sheet) using an electrophotographic system. The printer drive unit 152 includes a motor for rotating a photoreceptor drum, a mechanism unit for applying pressure to a fixing unit, a heater, and the like. The printer control unit 151 performs communication with the CPU 111 via the printer I/F 121, and controls operation of the printer drive unit 152. In the case of forming (printing) an image onto a recording medium, the printer control unit 151 receives setting information set by the user from the CPU 111, and controls operation of the printer drive unit 152 based on the setting information.

Power Control in Image Forming Apparatus 10

The image forming apparatus 10 of the present embodiment has a standby mode and a sleep mode as power modes. The CPU 111 performs power control in the image forming apparatus 10 by setting the power mode of the image forming apparatus 10 via the power source control unit 114. The standby mode (first mode) is a mode of operating in a state in which a scan operation can be executed by the scanner unit 14 and a print operation can be executed by the printer unit 15. The sleep mode (second mode) is a mode of operating in a power saving state in which power consumption is lower than in the standby mode. When the image forming apparatus 10 is operating in the sleep mode, power is supplied from the power source to the LAN controller 116, the power source control unit 114, the human detection sensor 16, and the CPU 131, which are the devices that are needed in order to return from the sleep mode to the standby mode.

If the state of non-use of the image forming apparatus 10 has continued for a predetermined time, the CPU 111 shifts the power mode of the image forming apparatus 10 from the standby mode to the sleep mode. For example, if a predetermined time has elapsed in a state in which the operation unit 13 has not been operated by the user, and furthermore a job has not been received from the external apparatus 20, the CPU 111 shifts the power mode of the image forming apparatus 10 from the standby mode to the sleep mode.

Detection States of Human Detection Sensor

In the present embodiment, the CPU 131 of the operation unit 13 measures the distance between the image forming apparatus 10 and an object that exists in front of (in the periphery of) of the apparatus based on output from the human detection sensor 16. Specifically, the CPU 131 causes the human detection sensor 16 to output a pulse wave. Accordingly, a signal indicating a result of reception of a reflected wave from the pulse wave is output from the human detection sensor 16 to the CPU 131. The CPU 131 measures the distance between the human detection sensor 16 (image forming apparatus 10) and an object (including a human) that exists inside the detection area 161 based on the time from when the human detection sensor 16 output the pulse wave until when the reflected wave from the pulse wave was received.

The CPU 131 compares the measurement value of the distance between the image forming apparatus 10 and the object that exists inside the detection area 161 with a reference value (threshold value $Th_{det}$, $Th_{det\_s}$, or the like that will be described later) in order to determine the detection state of the human detection sensor 16 with respect to that object. Specifically, the CPU 131 determines whether or not an object exists in the detection area 161 based on output from the human detection sensor 16, and then in the case of determining that an object exists, determines whether or not that object is a user of the image forming apparatus 10. In the present embodiment, the three states described below, namely a non-detection state ST1, an object detection state ST2, and a user detection state ST3, are defined as detection states of the human detection sensor 16.

Figure 3:
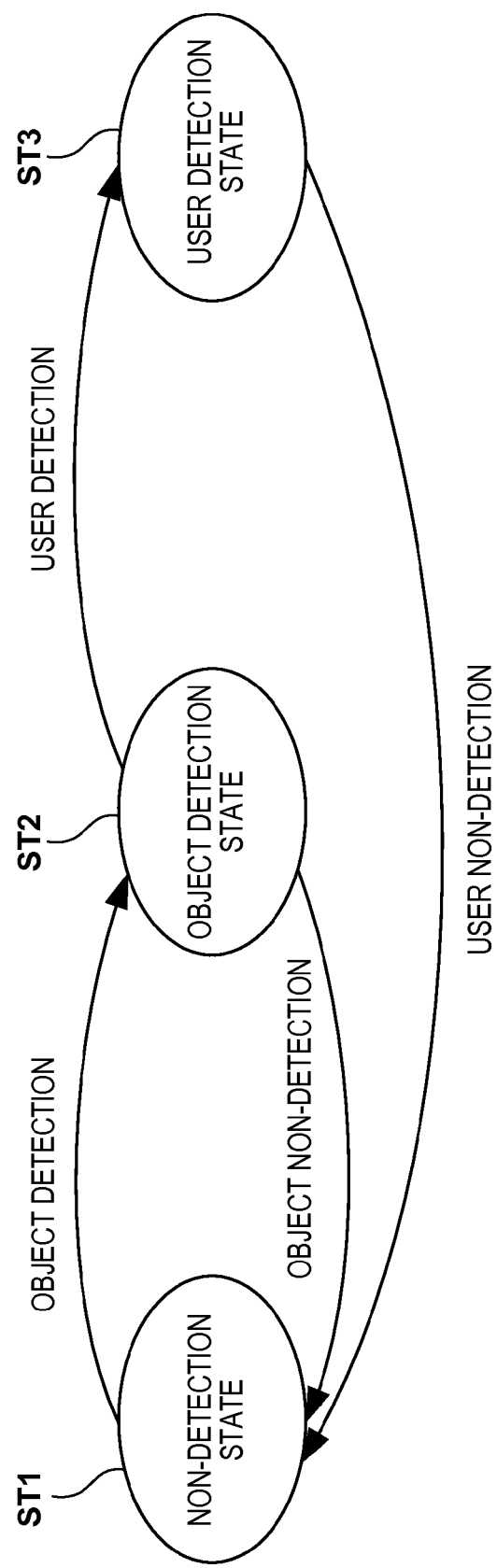
FIG. 3 is a state transition diagram showing an example of transitions in detection states of the human detection sensor 16.

FIG. 3 is a state transition diagram showing an example of transitions between detection states of the human detection sensor 16, which are determined by the CPU 131. As shown in FIG. 3, the detection state of the human detection sensor 16 transitions between the non-detection state ST1, the object detection state ST2, and the user detection state ST3 according to the distance between the image forming apparatus 10 and the object that exists inside the detection area 161.

Figure 7:
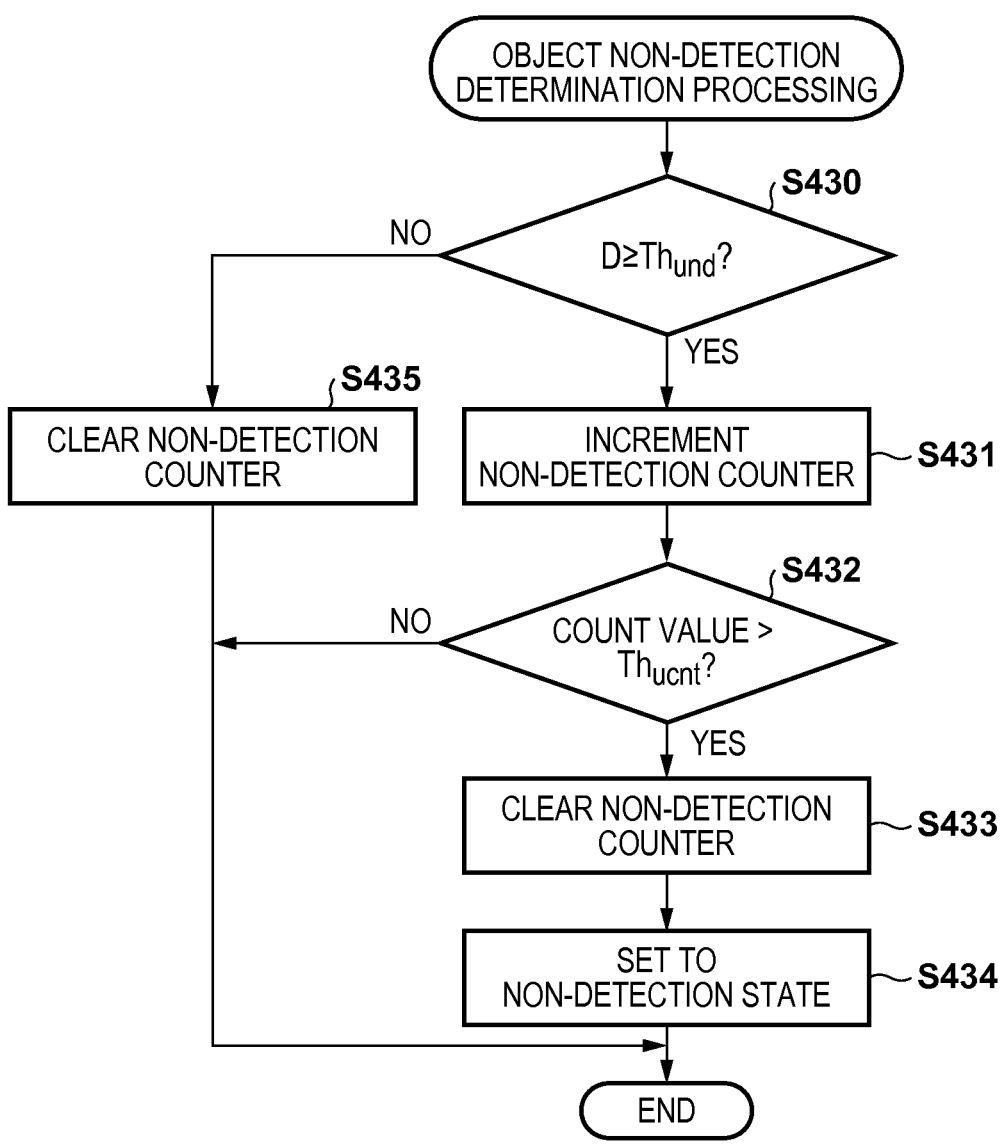
FIG. 7 is a flowchart showing a procedure of object non-detection determination processing (step S403).
Figure 8:
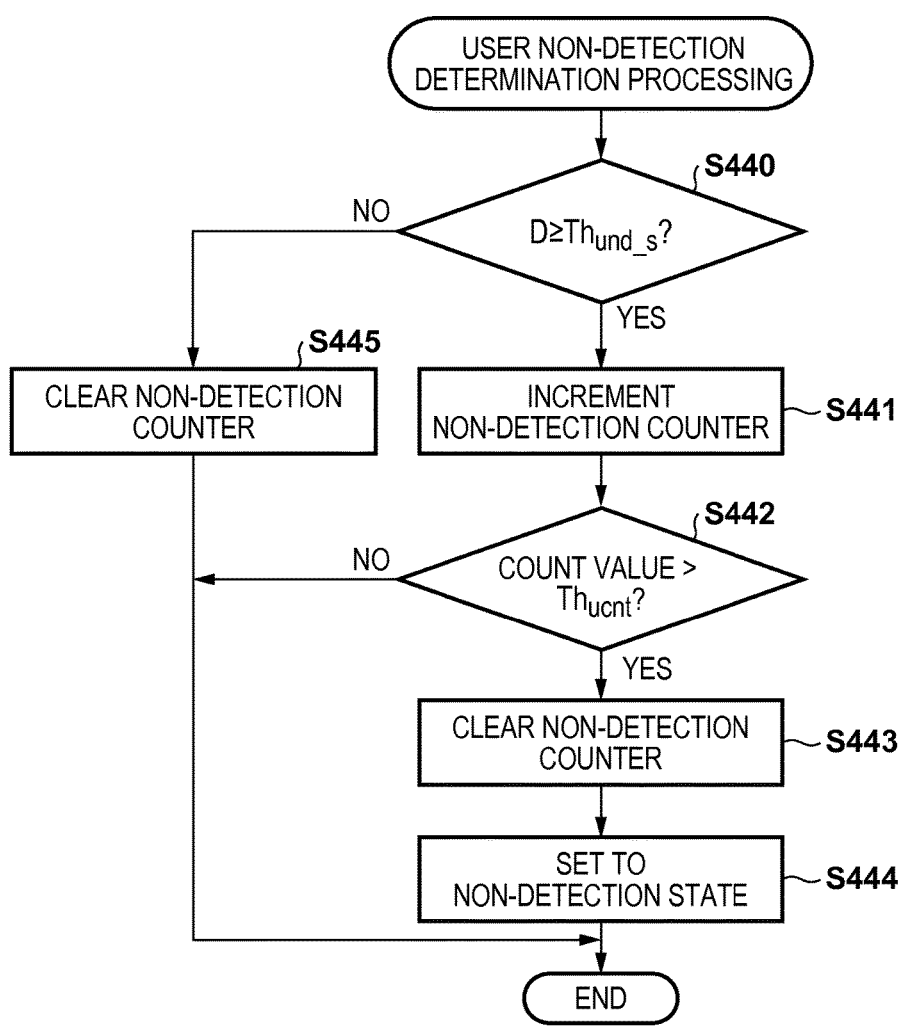
FIG. 8 is a flowchart showing a procedure of user non-detection determination processing (step S406).

The non-detection state ST1 corresponds to a state in which no object of any kind exists (has been detected) in the detection area 161 of the human detection sensor 16. In the case of determining that the distance between the image forming apparatus 10 and the object that exists inside the detection area 161, which was measured using the human detection sensor 16, has been greater than or equal to a predetermined threshold value ($Th_{und}$, $Th_{und\_s}$) for a certain time, the CPU 131 sets the detection state of the human detection sensor 16 to the non-detection state ST1. Accordingly, the CPU 131 causes the detection state to transition from another state (the object detection state ST2 or the user detection state ST3) to the non-detection state ST1 (FIGS. 7 and 8).

Figure 5:
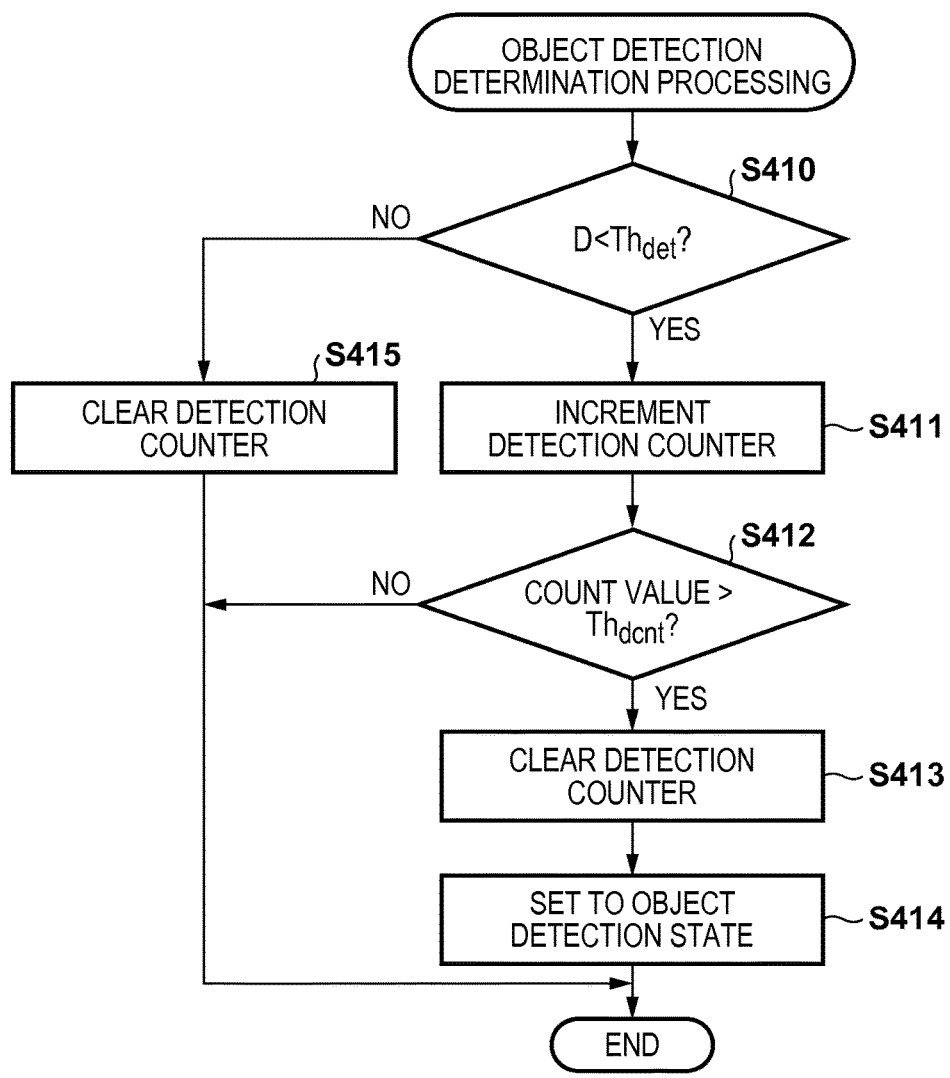
FIG. 5 is a flowchart showing a procedure of object detection determination processing (step S402).

The object detection state ST2 corresponds to a state in which an object (including a human) exists (has been detected) in the detection area 161 of the human detection sensor 16. In the case of determining that the distance measured using the human detection sensor 16 has been less than a predetermined threshold value ($Th_{det}$) for a certain time in the non-detection state ST1, the CPU 131 sets the detection state of the human detection sensor 16 to the object detection state ST2. Accordingly, the CPU 131 causes the detection state to transition from the non-detection state ST1 to the object detection state ST2 (FIG. 5).

Figure 6:
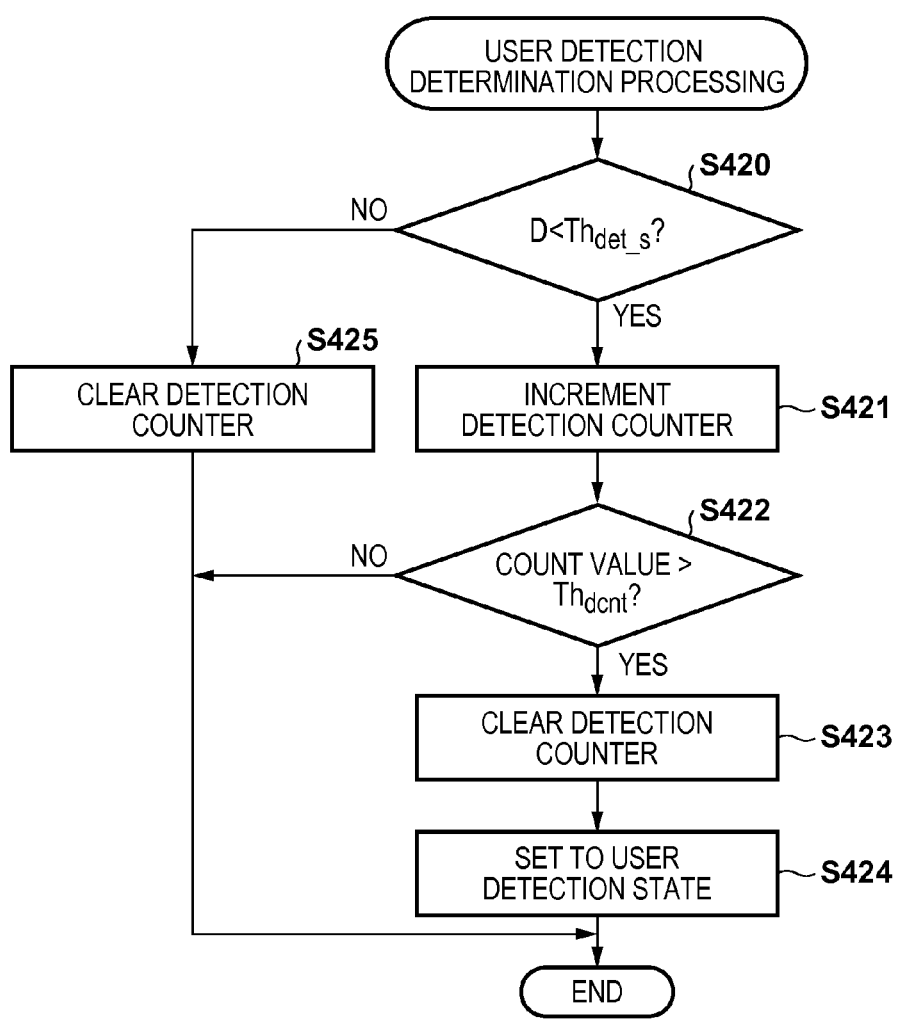
FIG. 6 is a flowchart showing a procedure of user detection determination processing (step S405).

The user detection state ST3 corresponds to a state in which an object exists (was detected) in the detection area 161 of the human detection sensor 16, and furthermore the object is a user with an intention of using the image forming apparatus 10. In other words, in the user detection state ST3, an object that exists in the detection area 161 (an object that exists in the periphery of the image forming apparatus 10) has been detected as a user of the image forming apparatus 10. In the case of determining that the distance measured using the human detection sensor 16 has been less than a predetermined threshold value ($Th_{det\_s}$) for a certain time in the object detection state ST2, the CPU 131 sets the detection state of the human detection sensor 16 to the user detection state ST3. Accordingly, the CPU 131 causes the detection state to transition from the object detection state ST2 to the user detection state ST3 (FIG. 6). Furthermore, by enabling a user detection signal, the CPU 131 notifies the power source control unit 114 that a user has been detected by the human detection sensor 16.

Note that the CPU 131 may notify the user that the user has been detected by the human detection sensor 16 by lighting or flashing an LED in the operation unit 13 based on the detection state of the human detection sensor 16. Also, the CPU 131 may change the state of supply of power to the LCD, the touch panel, the hardware keys, or the NFC reader/writer in the operation unit 13 based on the detection state of the human detection sensor 16.

Detection State Determination Processing

Figure 4:
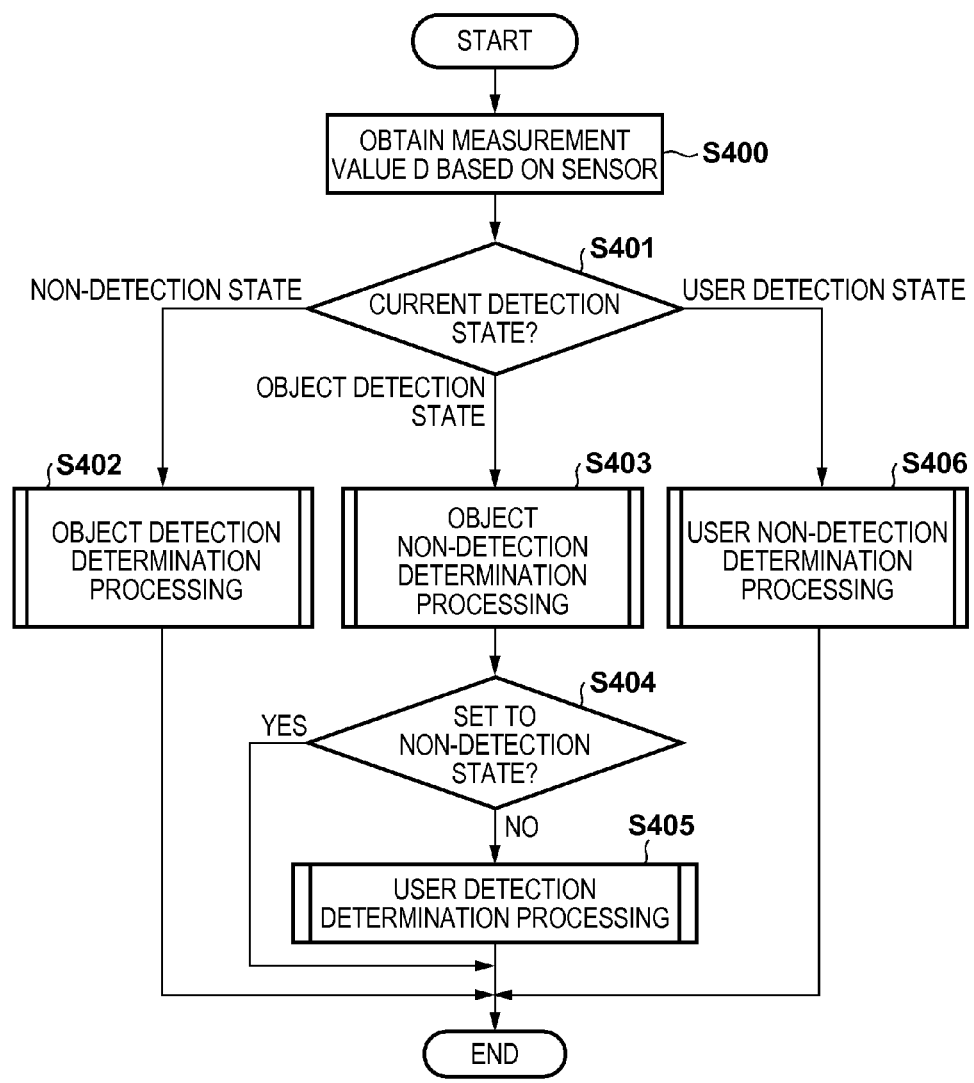
FIG. 4 is a flowchart showing a procedure of determination processing regarding the detection state of the human detection sensor 16.

FIG. 4 is a flowchart showing a procedure of determination processing executed by the CPU 131 of the operation unit 13 with respect to the detection state of the human detection sensor 16 regarding an object that exists inside the detection area 161. Note that the processing in the steps shown in FIG. 4 is realized in the image forming apparatus 10 by the CPU 131 reading out a control program stored in the ROM 113 and executing it. The CPU 131 executes the processing shown in FIG. 4 at a time interval that has been determined in advance (in predetermined units of time frames). Accordingly, as long as the image forming apparatus 10 is not in the power-off state, the CPU 131 can continue to check the measurement value of the distance between the image forming apparatus 10 and an object that exists in front of the apparatus, which is obtained using the human detection sensor 16, and can continue to check the detection state of the human detection sensor 16.

First, in step S400, the CPU 131 controls the human detection sensor 16 to output a pulse wave, and obtains a measurement value D of the distance between the image forming apparatus 10 and an object that exists in front of the apparatus, based on a signal output from the human detection sensor 16. Note that the CPU 131 may obtain an average of the currently obtained measurement value and previously obtained measurement values in order to reduce random noise contained in the obtained measurement value.

Next, in step S401, the CPU 131 determines the current detection state of the human detection sensor 16 regarding an object that exists inside the detection area 161. If the CPU 131 determines that the current detection state is the non-detection state ST1, in step S402, it then executes object detection determination processing according to the procedure shown in FIG. 5. When the processing in step S402 is complete, the CPU 131 ends this processing.

Also, if the CPU 131 determines in step S401 that the current detection state is the object detection state ST2, in step S403, it then executes object non-detection determination processing according to the procedure shown in FIG. 7. When the processing in step S403 is complete, in step S404, the CPU 131 then determines whether or not the current detection state was set to the non-detection state ST1 due to the object (human) moving out of the detection area 161 as a result of the processing in step S403. If the current detection state has been set to the non-detection state ST1 ("YES" in step S404), the CPU 131 ends this processing. On the other hand, if the object (human) has not moved out of the detection area 161, and the current detection state continues to be the object detection state ST2 ("NO" in step S404), the CPU 131 advances the processing to step S405. In step S405, the CPU 131 executes user detection determination processing according to the procedure shown in FIG. 6. When the processing in step S405 is complete, the CPU 131 ends this processing.

Also, if the CPU 131 determines in step S401 that the current detection state is the user detection state ST3, in step S406, it then executes user non-detection determination processing according to the procedure shown in FIG. 8. When the processing in step S406 is complete, the CPU 131 ends this processing.

Object Detection Determination Processing (Step S402)

FIG. 5 is a flowchart showing a procedure of object detection determination processing (step S402).

In object detection determination processing, first, in step S410, the CPU 131 determines whether or not the measurement value D of the distance obtained using the human detection sensor 16 is less than a predetermined threshold value ($Th_{det}$). If the measurement value D is greater than or equal to the predetermined threshold value ($Th_{det}$) ("NO" in step S410), the CPU 131 clears a detection counter in step S415, and then ends this processing. On the other hand, if the measurement value D is less than the predetermined threshold value ($Th_{det}$) ("YES" in step S410), the CPU 131 increments the detection counter in step S411, and then advances the processing to step S412.

In step S412, the CPU 131 determines whether or not the count value of the detection counter is greater than a predetermined threshold value ($Th_{dcnt}$). If the count value is less than or equal to the predetermined threshold value ($Th_{dcnt}$) ("NO" in step S412), the CPU 131 ends this processing. On the other hand, if the count value is greater than the predetermined threshold value ($Th_{dcnt}$) ("YES" in step S412), the CPU 131 advances the processing to step S413. The CPU 131 clears the detection counter in step S413, and then, in step S414, sets (changes) the detection state of the human detection sensor 16 (which is to be used in the next time frame) to the object detection state. Thereafter, the CPU 131 ends the object detection determination processing.

User Detection Determination Processing (Step S405)

FIG. 6 is a flowchart showing a procedure of user detection determination processing (step S405). This user detection determination processing is realized by an algorithm similar to the object detection determination processing shown in FIG. 5. Note that in step S424 corresponding to step S414, the detection state is set to the user detection state instead of the object detection state, and in step S420 corresponding to step S410, $Th_{det\_s}$, which is smaller than $Th_{det}$, is used as the predetermined threshold value.

In user detection determination processing, first, in step S420, the CPU 131 determines whether or not the measurement value D of the distance obtained using the human detection sensor 16 is less than a predetermined threshold value ($Th_{det\_s}$). If the measurement value D is greater than or equal to the predetermined threshold value ($Th_{det\_s}$) ("NO" in step S420), the CPU 131 clears a detection counter in step S425, and then ends this processing. On the other hand, if the measurement value D is less than the predetermined threshold value ($Th_{det\_s}$) (i.e., has fallen below the threshold value) ("YES" in step S420), the CPU 131 increments the detection counter in step S421, and then advances the processing to step S422.

In step S422, the CPU 131 determines whether or not the count value of the detection counter is greater than a predetermined threshold value ($Th_{dcnt}$). If the count value is less than or equal to the predetermined threshold value ($Th_{dcnt}$) ("NO" in step S422), the CPU 131 ends this processing. On the other hand, if the count value is greater than the predetermined threshold value ($Th_{dcnt}$) ("YES" in step S422), the CPU 131 advances the processing to step S423. The CPU 131 clears the detection counter in step S423, and then, in step S424, sets (changes) the detection state of the human detection sensor 16 (which is to be used in the next time frame) to the user detection state. Thereafter, the CPU 131 ends the user detection determination processing.

Object Non-Detection Determination Processing
(Step S403)

FIG. 7 is a flowchart showing a procedure of object non-detection determination processing (step S403).

In object non-detection determination processing, first, in step S430, it is determined whether or not the measurement value D of the distance obtained using the human detection sensor 16 is less than a predetermined threshold value ($Th_{und}$). If the measurement value D is less than the predetermined threshold value ($Th_{und}$) ("NO" in step S430), the CPU 131 clears a non-detection counter in step S435, and then ends this processing. On the other hand, if the measurement value D is greater than or equal to the predetermined threshold value ($Th_{und}$) ("YES" in step S430), the CPU 131 increments the non-detection counter in step S431, and then advances the processing to step S432.

In step S432, the CPU 131 determines whether or not the count value of the non-detection counter is greater than a predetermined threshold value ($Th_{ucnt}$). If the count value is less than or equal to the predetermined threshold value ($Th_{ucnt}$) ("NO" in step S432), the CPU 131 ends this processing. On the other hand, if the count value is greater than the predetermined threshold value ($Th_{ucnt}$) ("YES" in step S432), the CPU 131 advances the processing to step S433. The CPU 131 clears the non-detection counter in step S433, and then, in step S434, sets (changes) the detection state of the human detection sensor 16 (which is to be used in the next time frame) to the non-detection state. Thereafter, the CPU 131 ends the object non-detection determination processing.

User Non-Detection Determination Processing
(Step S406)

FIG. 8 is a flowchart showing a procedure of user non-detection determination processing (step S406). This user non-detection determination processing is realized by an algorithm similar to the object non-detection processing shown in FIG. 7. Note that in step S434 corresponding to step S430, $Th_{und\_s}$ having the same value as $Th_{und}$ is used as the predetermined threshold value.

In user non-detection determination processing, first, in step S440, it is determined whether or not the measurement value D of the distance obtained using the human detection sensor 16 is less than a predetermined threshold value ($Th_{und\_s}$). If the measurement value D is less than the predetermined threshold value ($Th_{und\_s}$) ("NO" in step S440), the CPU 131 clears a non-detection counter in step S445, and then ends this processing. On the other hand, if the measurement value D is greater than or equal to the predetermined threshold value ($Th_{und\_s}$) ("YES" in step S440), the CPU 131 increments the non-detection counter in step S441, and then advances the processing to step S442.

In step S442, the CPU 131 determines whether or not the count value of the non-detection counter is greater than a predetermined threshold value ($Th_{ucnt}$). If the count value is less than or equal to the predetermined threshold value ($Th_{ucnt}$) ("NO" in step S442), the CPU 131 ends this processing. On the other hand, if the count value is greater than the predetermined threshold value ($Th_{ucnt}$) ("YES" in step S442), the CPU 131 advances the processing to step S443. The CPU 131 clears the non-detection counter in step S443, and then, in step S444, sets (changes) the detection state of the human detection sensor 16 (which is to be used in the next time frame) to the non-detection state. Thereafter, the CPU 131 ends the user non-detection determination processing.

Power Mode Control Based on Detection State of Human Detection Sensor 16

In the present embodiment, the CPU 111 performs power control in the image forming apparatus 10 by switching the power mode of the image forming apparatus 10 between the standby mode and the sleep mode in accordance with the detection state of the human detection sensor 16, which is determined by the CPU 131. Specifically, if a user has been detected inside the detection area 161 of the human detection sensor 16 (the detection state is the user detection state ST3), the CPU 111 sets the power mode of the image forming apparatus 10 to the standby mode. On the other hand, if a user has not been detected inside the detection area 161 of the human detection sensor 16 (the detection state is the non-detection state ST1 or the object detection state ST2), the CPU 111 sets the power mode of the image forming apparatus 10 to the sleep mode.

Also, in the present embodiment, the following processing is performed so that the image forming apparatus 10 can automatically shift to the sleep mode (power saving state) even in the case where an object or a human with no intention of using the image forming apparatus 10 continues to exist in the periphery of the image forming apparatus 10. Specifically, if the state in which a user has been detected inside the detection area 161 continues for a predetermined time in the standby mode, the CPU 131 changes the sensitivity of the human detection sensor 16 such that the object detected by the human detection sensor 16 is no longer detected as a user. In other words, even if an object continues to exist inside the detection area 161, by preventing the object from being detected as a user, it is possible for the image forming apparatus 10 to automatically shift to the sleep mode. Note that a specific example of this processing will be described later with reference to FIG. 10.

Also, in the present embodiment, the following processing is performed such that even if a user who pressed the power save button remains in the periphery of the image forming apparatus 10, the image forming apparatus 10 that has shifted to the sleep mode is prevented from returning from the sleep mode. Specifically, if a user presses the power save button while the user is being detected inside the detection area 161, the CPU 131 changes the sensitivity of the human detection sensor 16 such that the object detected by the human detection sensor 16 is no longer detected as the user. Here, the pressing of the power save button corresponds to an operation for changing the power mode from the standby mode to the sleep mode. In this way, even if a human remains inside the detection area 161, by preventing that human from being detected as a user, the image forming apparatus 10 is prevented from returning from the standby mode. Note that a specific example of this processing will be described later with reference to FIG. 11.

Hereinafter, three examples of relationships between detection states of the human detection sensor 16 and the power modes of the image forming apparatus 10 will be described with reference to FIGS. 9 to 11. Note that in the following examples, the above-described changing of the sensitivity of the human detection sensor 16 is performed by changing the reference value used in the determination of the detection state of the human detection sensor 16.

First Example

Figure 9:
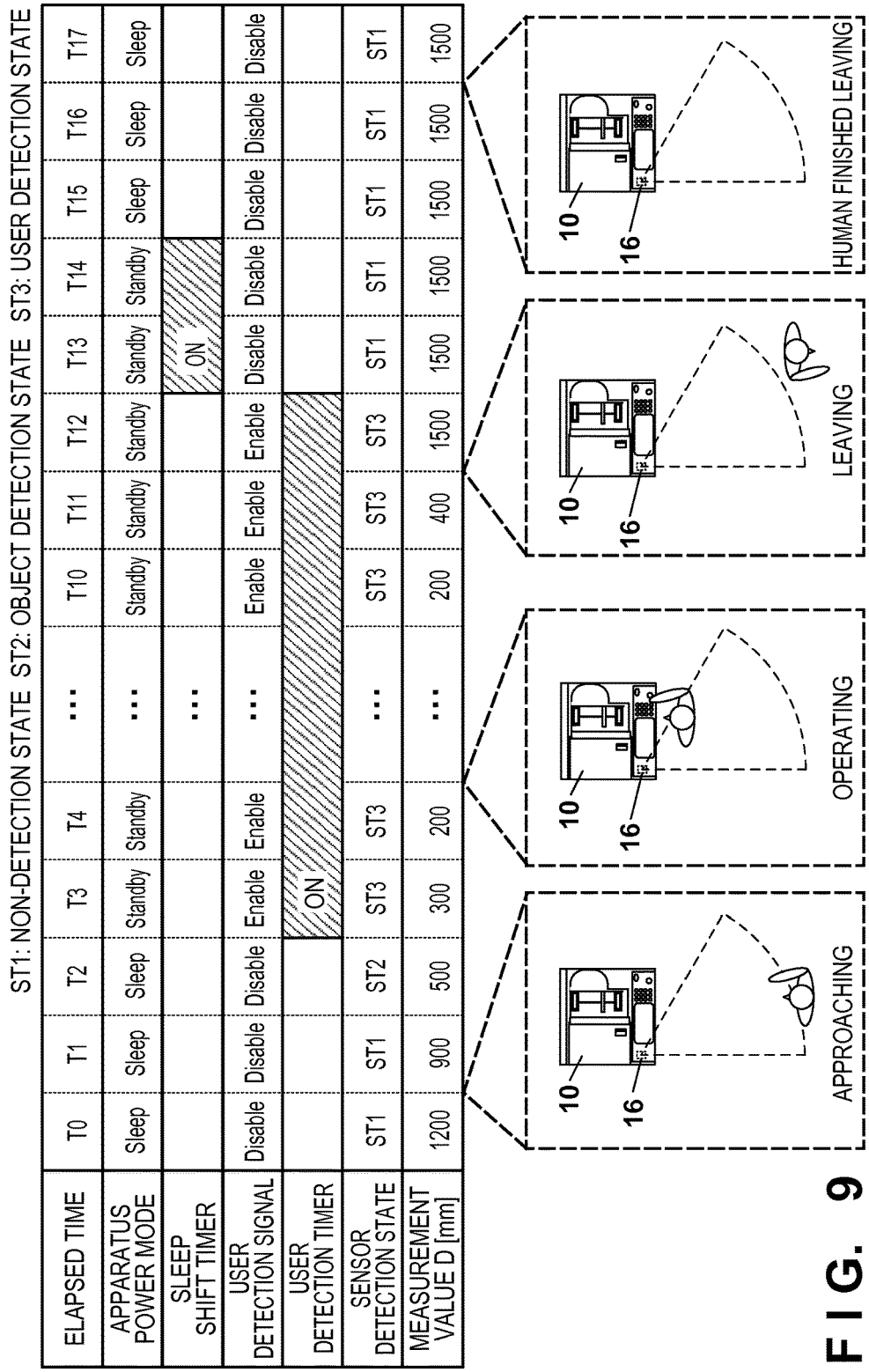
FIG. 9 is a diagram showing a first example of a relationship between detection states of the human detection sensor 16 and power modes of the image forming apparatus.

FIG. 9 is a diagram showing a first example of the relationship between the detection states of the human detection sensor 16 regarding an object that exists inside the detection area 161 and the power modes of the image forming apparatus 10. FIG. 9 shows an example in which, in particular, a human (user) approaches the detection area 161 of the image forming apparatus 10, operates the image forming apparatus 10 inside the detection area 161, and then moves out of the detection area 161. Also, in this example, the threshold values have been set in advance as follows: $Th_{det}=Th_{und}=Th_{und\_s}=1000$ [mm], $Th_{det\_s}=700$ [mm], and $Th_{dcnt}=Th_{ucnt}=1$.

FIG. 9 shows a situation in which a human approaches the image forming apparatus 10 from time T0 to time T3. At time T0, the state is a state in which a human does not exist inside the detection area 161, a distance measurement value D of 1200 is obtained by the human detection sensor 16, and D>$Th_{det}$. For this reason, the CPU 131 determines that the detection state of the human detection sensor 16 regarding an object that exists inside the detection area 161 is "non-detection state ST1".

At time T1, the state is a state in which a human has entered the detection area 161, a distance measurement value D of 900 is obtained by the human detection sensor 16, and D<$Th_{det}$. For this reason, the CPU 131 determines that the detection state of the human detection sensor 16 is "object detection state ST2". This detection result is reflected in the detection state in the next frame (time T2).

At time T2, the state is a state in which the human has further approached the image forming apparatus 10 inside the detection area 161, a distance measurement value D of 500 is obtained by the human detection sensor 16, and D<$Th_{det\_s}$. For this reason, the CPU 131 determines that the detection state of the human detection sensor 16 is "user detection state ST3", that is to say, determines that the object that exists inside the detection area 161 is a user with an intention of using the image forming apparatus 10. This detection result is reflected in the detection state in the next frame (time T3).

The CPU 131 enables the user detection signal in accordance with this determination result, and starts the counting of a user detection timer (sets the user detection timer to ON) provided in the CPU 131. When the user detection signal is enabled, the power source control unit 114 notifies the state of the user detection signal to the CPU 111. After receiving this notification, the CPU 111 changes the power mode of the image forming apparatus 10 from the sleep mode to the standby mode via the power source control unit 114.

From time T4 to time T10, the human (user) is using the image forming apparatus 10. In this period, the distance measurement value D<$Th_{und\_s}$, and therefore the CPU 131 continues to make the determination that the detection state of the human detection sensor 16 is "user detection state ST3".

Thereafter, from time T11 to time T13, the human (user) finishes using the image forming apparatus 10 and moves out of the detection area 161. At time T12, a distance measurement value D of 1500 is obtained by the human detection sensor 16, and D≥$Th_{und\_s}$. For this reason, the CPU 131 determines that the detection state of the human detection sensor 16 is "non-detection state ST1". This detection result is reflected in the detection state in the next frame (time T13).

The CPU 131 disables the user detection signal in accordance with this detection result, and clears the count value of the user detection timer (sets the user detection timer to OFF). When the user detection signal is disabled, the power source control unit 114 notifies the state of the user detection signal to the CPU 111. After receiving this notification, the CPU 111 starts the counting of a sleep shift timer (sets the sleep shift timer to ON) provided in the CPU 111. When the count value of the sleep shift timer exceeds a predetermined threshold value ($Th_{slp}$), the CPU 111 instructs the power source control unit 114 to change the power mode of the image forming apparatus 10 from the standby mode to the sleep mode. Accordingly, the power mode of the image forming apparatus 10 is set to the sleep mode from time T15 onward.

Second Example

FIG. 10 is a diagram showing a second example of the relationship between the detection states of the human detection sensor 16 regarding an object that exists inside the detection area 161 and the power modes of the image forming apparatus 10. FIG. 10 shows an example in which, in particular, a human (user) holding some sort of object approaches the detection area 161 of the image forming apparatus 10, operates the image forming apparatus 10 inside the detection area 161, and then places the object in front of the human detection sensor 16 and moves out of the detection area 161. Note that in this example, similarly to the first example (FIG. 9), the threshold values have been set in advance as follows: $Th_{det}=Th_{und}=Th_{und\_s}=1000$ [mm], $Th_{det\_s}=700$ [mm], and $Th_{dcnt}=Th_{ucnt}=1$.

In FIG. 10, the measurement value D of the distance obtained by the human detection sensor 16 is similar to that in FIG. 9 from time T0 to T11, and is different from that in FIG. 9 from time T12 onward. This is due to the object placed in front of the human detection sensor 16. Specifically, the distance between the human detection sensor 16 (image forming apparatus 10) and the object placed in front of the human detection sensor 16 is reflected in the measurement value D that is obtained. Because the position of the object placed in front of the human detection sensor 16 does not change, a measurement value D of 500 continues to be obtained from time T12 onward. As a result, the CPU 131 continues to determine that the detection state of the human detection sensor 16 is "user detection state ST3". In accordance with this detection result, the enabled state of the user detection signal continues, and the CPU 111 does not start the counting of the sleep shift timer during this time.

Thereafter, when the count value of the user detection timer exceeds a predetermined threshold value ($Th_{user}$) (i.e., when the state in which the user has been detected continues for a predetermined time), the CPU 131 executes the following processing. Specifically, the CPU 131 changes the threshold values $Th_{det\_s}$ and $Th_{und\_s}$, which are used for determining the detection state of the human detection sensor 16, to values that are smaller than the most recent measurement value D (=500) that was obtained by the human detection sensor 16. In this example, the CPU 131 changes $Th_{det\_s}$ from the current value of 700 to the value of 400, and changes $Th_{und\_s}$ from the current value of 1000 to the value of 450.

As a result, the relationship between the measurement value D (=500) obtained by the human detection sensor 16 and the threshold value $Th_{und\_s}$ (=450) becomes $D > Th_{und\_s}$. Accordingly, at time T19, the CPU 131 determines that the detection state of the human detection sensor 16 is "non-detection state ST1", and this detection result is reflected in the detection state in the next frame (time T20).

The CPU 131 disables the user detection signal in accordance with this detection result, and clears the count value of the user detection timer (sets the user detection timer to OFF). When the user detection signal is disabled, the power source control unit 114 notifies the state of the user detection signal to the CPU 111. After receiving this notification, the CPU 111 starts the counting of a sleep shift timer (sets the sleep shift timer to ON) provided in the CPU 111. In this example, after the counting of the sleep shift timer has started, the detection state of the human detection sensor 16 does not transition to "user detection state ST3" again due to the object continuing to have been placed inside the detection area 161. This is due to the fact that the relationship between the measurement value D (=500) obtained by the human detection sensor 16 and the changed threshold value $Th_{det\_s}$ (=400) is $D > Th_{det\_s}$. Accordingly, the user detection signal is not enabled, and the CPU 111 does not shift the power mode of the image forming apparatus 10 to the standby mode.

When the count value of the sleep shift timer exceeds a predetermined threshold value ($Th_{slp}$), the CPU 111 instructs the power source control unit 114 to change the power mode of the image forming apparatus 10 from the standby mode to the sleep mode. Accordingly, the power mode of the image forming apparatus 10 is set to the sleep mode from time T22 onward.

In this way, according to this example, the image forming apparatus 10 can automatically shift to the sleep mode (power saving state) even in the case where an object or a human with no intention of using the image forming apparatus 10 continues to exist in the periphery of the image forming apparatus 10. Also, according to this example, the power mode of the image forming apparatus 10 can be shifted to the sleep mode not only in the case where an object has been placed in front of the human detection sensor 16, but also in the case where, for example, a human is performing a task or having a conversation inside the detection area 161.

Note that the changing of $Th_{det\_s}$ and $Th_{und\_s}$ to smaller values as in this example is equivalent to lowering the sensitivity of the human detection sensor 16, and makes it less likely for an object (user) inside the detection area 161 to be detected (i.e., makes the detection area 161 narrower). In order to prevent this state from continuing to be maintained, the CPU 131 may store the pre-change threshold values $Th_{det\_s}$ and $Th_{und\_s}$ in the RAM 112, and revert $Th_{det\_s}$ and $Th_{und\_s}$ to the pre-change values after the elapse of a certain time. In other words, the CPU 131 may revert the sensitivity of the human detection sensor 16 to the pre-change sensitivity. Accordingly, if the object placed in front of the human detection sensor 16 as shown in FIG. 10 is removed, for example, it is possible for the power control in the image forming apparatus 10, which is in accordance with the detection state of the human detection sensor 16, to be resumed based on the pre-change sensitivity.

Also, in this example, $Th_{det\_s}$ and $Th_{und\_s}$ are changed if the count value of the user detection timer exceeds a predetermined threshold value ($Th_{user}$), but another threshold value may also be changed at the same time.

Third Example

Figure 11:
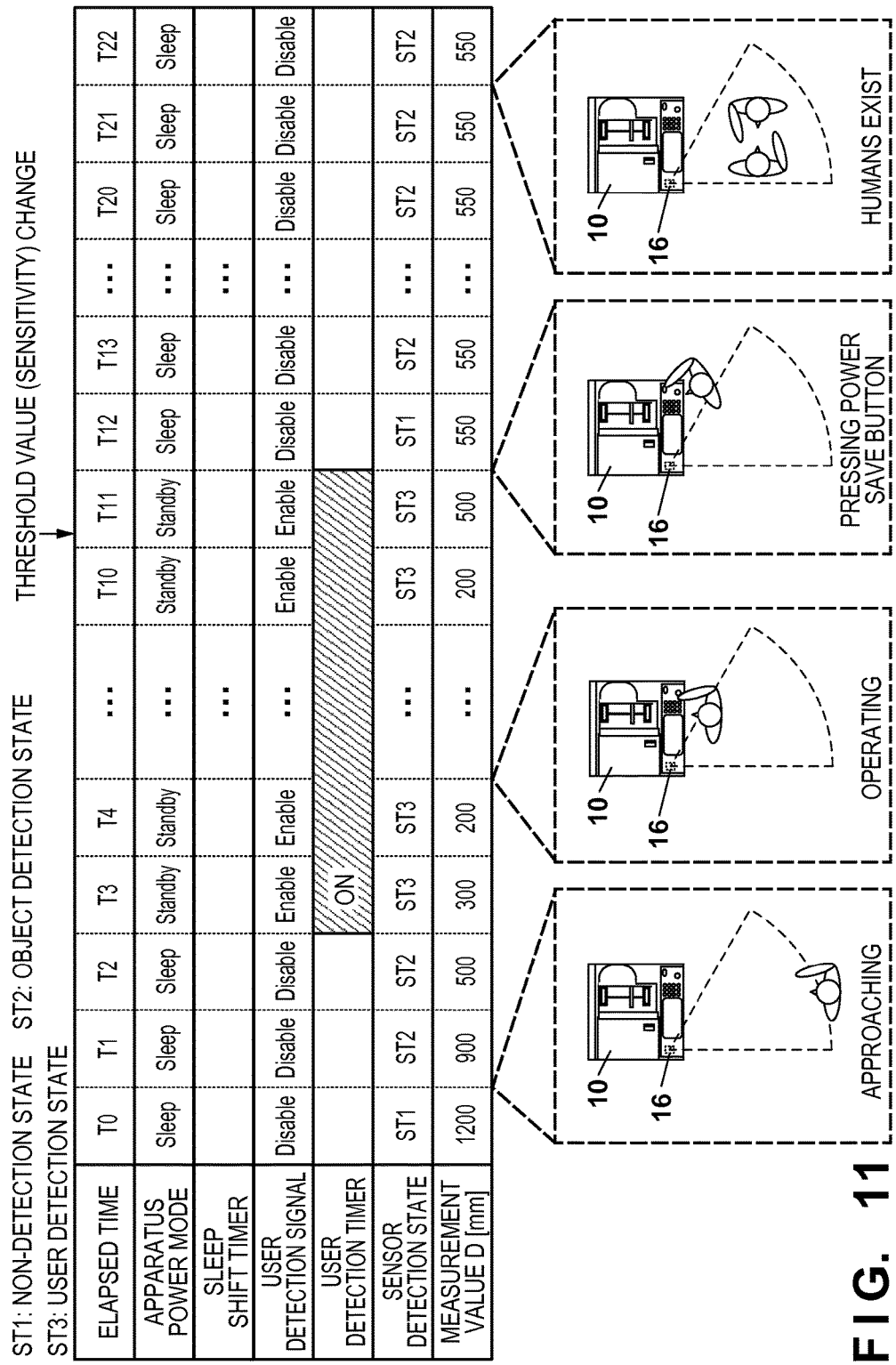
FIG. 11 is a diagram showing a third example of a relationship between detection states of the human detection sensor 16 and power modes of the image forming apparatus.

FIG. 11 is a diagram showing a third example of the relationship between the detection states of the human detection sensor 16 regarding an object that exists inside the detection area 161 and the power modes of the image forming apparatus 10. FIG. 11 shows an example in which, in particular, a human (user) operates the image forming apparatus 10 inside the detection area 161, and then presses the power save button provided in the operation unit 13 and remains inside the detection area 161. The power save button is used for shifting the power mode of the image forming apparatus 10 from the standby mode to the sleep mode. Note that in this example, similarly to the first example (FIG. 9), the threshold values have been set in advance as follows: $Th_{det} = Th_{und} = Th_{und\_s} = 1000$ [mm], $Th_{det\_s} = 700$ [mm], and $Th_{dcnt} = Th_{ucnt} = 1$.

From time T0 to time T10, the state is the same as that in the first example (FIG. 9). Note that in this example, from time T10 to time T11, the user presses the power save button provided in the operation unit 13 in order to shift the power mode of the image forming apparatus 10 to the sleep mode. Upon detecting the pressing of the power save button due to a notification from the operation unit 13, the CPU 111 instructs the power source control unit 114 to change the power mode of the image forming apparatus 10 from the standby mode to the sleep mode.

Upon receiving this instruction from the CPU 111, the power source control unit 114 interrupts the supply of power to devices in the image forming apparatus 10. Accordingly, the transmission of image data for display on the LCD from the CPU 111 to the operation unit 13 also stops. The CPU 131 monitors whether or not image data is being transmitted from the CPU 111 to the LCD controller in the operation unit 13, and detects the pressing of the power save button (an instruction to shift to the sleep mode) based on the stopping of the transmission of image data. Note that if the CPU 131 and the power save button are electrically connected to each other, the CPU 131 may directly detect the pressing of the power save button (an instruction to shift to the sleep mode).

If the power save button is pressed, the CPU 131 changes the threshold values $Th_{det\_s}$ and $Th_{und\_s}$, which are used for determining the detection state of the human detection sensor 16, to values that are smaller than the most recent measurement value D (=500) that was obtained by the human detection sensor 16. In this example, similarly to the second example (FIG. 10), the CPU 131 changes $Th_{det\_s}$ from the current value of 700 to the value of 400, and changes $Th_{und\_s}$ from the current value of 1000 to the value of 450. Note that the timing of the changing of the threshold values may, instead of being the same timing as the timing of the pressing of the power save button, be a timing at which, for example, a certain time has elapsed from the timing of the pressing of the power save button. In other words, the threshold values can be changed at a timing that is in accordance with the pressing of the power save button.

As a result, the relationship between the measurement value D (=500) obtained by the human detection sensor 16 and the threshold value $Th_{und\_s}$ (=450) becomes $D > Th_{und\_s}$. Accordingly, at time T11, the CPU 131 determines that the detection state of the human detection sensor 16 is "non-detection state ST1", and this detection result is reflected in the detection state in the next frame (time T12).

The CPU 131 disables the user detection signal in accordance with this detection result, and clears the count value of the user detection timer (sets the user detection timer to OFF). When the user detection signal is disabled, the power source control unit 114 notifies the state of the user detection signal to the CPU 111. In this example, even if a human (user) remains inside the detection area 161 from time T13 onward, the detection state of the human detection sensor 16 does not transition to "user detection state ST3" again. This is due to the fact that the relationship between the measurement value D (=550) obtained by the human detection sensor 16 and the changed threshold value $Th_{det\_s}$ (=400) is D>$Th_{det\_s}$. Accordingly, the user detection signal is not enabled, and the CPU 111 does not shift the power mode of the image forming apparatus 10 to the standby mode.

In this way, according to the present embodiment, even if a user who pressed the power save button remains in the periphery of the image forming apparatus 10, the image forming apparatus 10 that has shifted to the sleep mode can be prevented from returning from the sleep mode.

Also, in the first to third examples, the timing of the starting of the counting of the sleep shift timer is not necessarily required to be the timing described above. For example, it may be the timing at which the user last performed an operation on the operation unit 13, or the power mode of the image forming apparatus 10 may be shifted to the sleep mode if a predetermined time has elapsed in a state in which the image forming apparatus 10 has not been operated. Also, the processing described in both the second and third examples, rather than merely one of them, may be implemented in the image forming apparatus 10.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-224616, filed Nov. 4, 2014, which is hereby incorporated by reference herein in its entirety.

What is claimed is:

1. An information processing apparatus that has a first power state and a second power state having lower power consumption than the first power state, the information processing apparatus comprising:
  a sensor which senses a human around the information processing apparatus; and
  a controller which includes one or more processors and one or more memories,
  wherein the controller
  determines that a human exists in a periphery of the information processing apparatus based on an output value from the sensor and a first threshold value and determines that a user of the information processing apparatus exists in a periphery of the information processing apparatus based on the output value from the sensor and a second threshold value different from the first threshold value,
  shifts the information processing apparatus to the first power state from the second power state based on a determination that the user of the information processing apparatus exists in a periphery of the information processing apparatus; and
  changes the second threshold value in order to become difficult to determine that the user of the information processing apparatus exists in a periphery of the information processing apparatus in a case where the output value output from the sensor remains exceeding the second threshold value for a predetermined amount of time.

2. The information processing apparatus according to claim 1, wherein the controller lowers the threshold value in the case where a state, in which the output value output from the sensor falls within a predetermined range, continues for a predetermined amount of time.

3. The information processing apparatus according to claim 1, wherein
  in a case where an operation for changing the information processing apparatus from the first power state to the second power state is performed by a user while the output value output from the sensor falls within a predetermined range, the controller changes the threshold value such that the output value output from the sensor does not fall within the predetermined range.

4. The information processing apparatus according to claim 1, wherein
  it is determined that the user exists in a periphery of the information processing apparatus in a case where the output value falls within the predetermined range, and
  the controller changes the threshold value to a value smaller than a most recent output value output from the sensor.

5. The information processing apparatus according to claim 1, wherein
  in a case where the user is no longer determined to exist in a periphery of the information processing apparatus while the information processing apparatus has been set to the first power state, the controller changes the information processing apparatus from the first power state to the second power state.

6. A control method for controlling an information processing apparatus that has a first power state and a second power state having lower power consumption than the first power state, the information processing apparatus comprising a sensor which senses a human around the information processing apparatus, and the method comprising:
  determining that a human exists in a periphery of the information processing apparatus based on an output value from the sensor and a first threshold value and determining that a user of the information processing apparatus exists in a periphery of the information processing apparatus based on the output value from the sensor and a second threshold value different from the first threshold value, shifting the information processing apparatus to the first power state from the second power state based on a determination that the user of the information processing apparatus exists in a periphery of the information processing apparatus; and changing the second threshold value in order to become difficult to determine that the user of the information processing apparatus exists in a periphery of the information processing apparatus in a case where the output value output from the sensor remains exceeding the second threshold value for a predetermined amount of time.

7. The control method according to claim 6, wherein in the changing, the threshold value is lowered in the case where a state in which the output value output from the sensor falls within a predetermined range for a predetermined amount of time.

8. The control method according to claim 6, wherein
in a case where an operation for changing the information processing apparatus from the first power state to the second power state is performed by a user while the output value output from the sensor falls within a predetermined range, the threshold value is changed, in the changing, such that the output value output from the sensor does not fall within the predetermined range.

9. The control method according to claim 6, wherein
it is determined that the user exists in a periphery of the information processing apparatus, in a case where the output value falls within the predetermined range, and
in the changing, the threshold value is changed to a value smaller than a most recent output value output from the sensor.

10. The control method according to claim 6, wherein
in a case where the user is no longer determined to exist in a periphery of the information processing apparatus while the information processing apparatus has been set to the first power state, in the shifting, the information processing apparatus is changed from the first power state to the second power state.

11. A non-transitory computer-readable storage medium storing a computer program for causing a computer to execute steps of a control method for controlling an information processing apparatus that has a first power state and a second power state having lower power consumption than the first power state, the information processing apparatus comprising a sensor which senses a human around the information processing apparatus, and the method comprising:

determining that a human exists in a periphery of the information processing apparatus based on an output value from the sensor and a first threshold value and determining that a user of the information processing apparatus exists in a periphery of the information processing apparatus based on the output value from the sensor and a second threshold value different from the first threshold value, shifting the information processing apparatus to the first power state from the second power state based on a determination that the user of the information processing apparatus exists in a periphery of the information processing apparatus; and changing the second threshold value in order to become difficult to determine that the user of the information processing apparatus exists in a periphery of the information processing apparatus in a case where the output value output from the sensor remains exceeding the second threshold value for a predetermined amount of time.

* * * * *